Aug. 2, 1966  A. W. LOHMANN  3,264,611
OPTICAL MULTIPLEXING

Filed March 9, 1964  12 Sheets-Sheet 1

INVENTOR.
ADOLF W. LOHMANN
BY Elmer Galbiati
ATTORNEY

-- TOTALLY TRANSPARENT
-- TOTALLY OPAQUE
-- SEMI TRANSPARENT

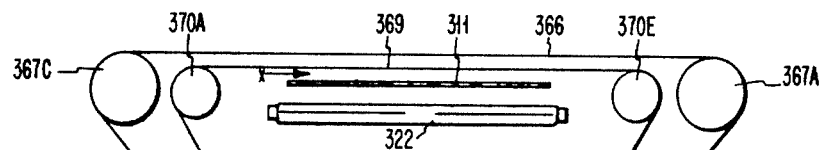
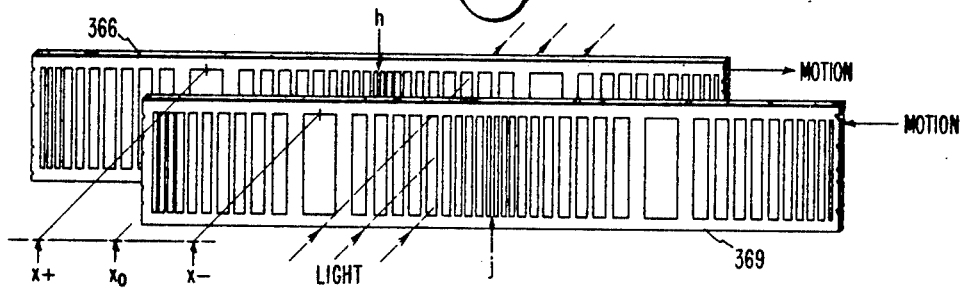
FIG. 23
FIG. 24
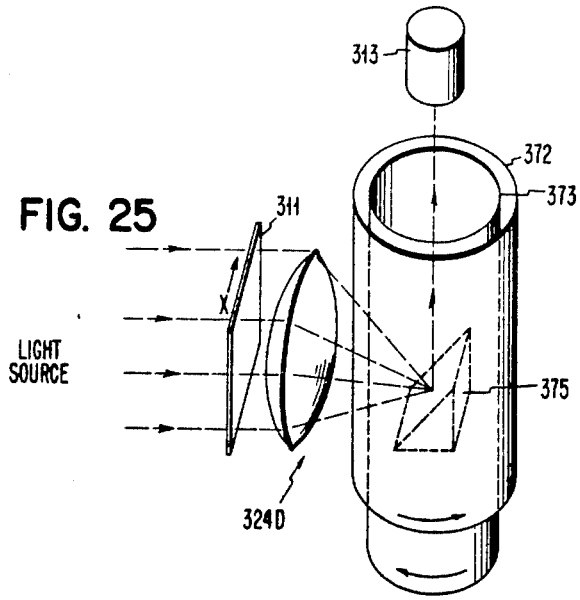
FIG. 25

Aug. 2, 1966  A. W. LOHMANN  3,264,611
OPTICAL MULTIPLEXING

Filed March 9, 1964  12 Sheets-Sheet 9

Aug. 2, 1966   A. W. LOHMANN   3,264,611
OPTICAL MULTIPLEXING

Filed March 9, 1964                12 Sheets-Sheet 10

United States Patent Office 3,264,611
Patented August 2, 1966

3,264,611
OPTICAL MULTIPLEXING
Adolf W. Lohmann, San Jose, Calif., assignor to International Business Machines Corporation, New York, N.Y., a corporation of New York
Filed Mar. 9, 1964, Ser. No. 350,483
15 Claims. (Cl. 340—146.3)

This invention relates to optical systems and more particularly to techniques for multiplexing optical signals.

Techniques for transmitting a plurality of electronic signals over a single channel are well developed. For example, a single transmission line can be used to transmit a plurality of signals by modulating each signal at a different carrier frequency. At the receiving end the various carrier frequencies can be filtered into individual channels and then each signal can be demodulated from its associated carrier.

One aspect of the present invention is directed towards optically combining a plurality of independent signals into a single optical signal. This optical signal can then be transmitted either optically or by electronic means to a de-multiplexor wherein the component signals can again be recreated. The de-multiplexor may, according to other aspects of the invention, be either an electronic device or an optical device.

Another aspect of the present invention is directed towards a character recognition device which is capable of simultaneously reading a plurality of characters using a single photoreceptor. A character recognition device built according to the invention has many advantages among which is the fact that the device includes a relatively small number of components at the reading station due to the fact that a plurality of characters are read simultaneously by a single photoreceptor. Furthermore, the signal generated by the multiplexing apparatus of the present invention has certain advantages with respect to character recognition. With the multiplexing device of the present invention the signal generated from a character is shift invariant within certain limits.

An object of the present invention is to provide an improved optical multiplexing device.

A further object of the present invention is to provide an optical multiplexing device which utilizes a single photoreceptor.

A still further object of the present invention is to provide a device for simultaneously modulating a plurality of optical signals at different frequencies.

A still further object of the present invention is to provide a device which effects a displacement frequency transformation on a continuous basis.

Yet another object of the present invention is to provide an improved facsimile system.

A still further object of the present invention is to provide a facsimile system which can simultaneously receive light from an entire document using a single photoreceptor and which can recreate an image of the document using a single modulated light source.

Another object of the present invention is to provide an improved character recognition device.

Yet another object of the present invention is to provide a shift invariant character recognition device.

Yet another object of the present invention is to provide a device for transforming light modulated by a visible character into an electrical signal which can easily be used for character recognition purposes.

The foregoing and other objects, features and advantages of the invention will be apparent from the following more particular description of preferred embodiments of the invention, as illustrated in the accompanying drawings.

FIGURE 23 shows another embodiment of a dynamic shutter.

FIGURE 24 shows a portion of the belts in the dynamic shutter shown in FIGURE 23.

FIGURE 25 shows another embodiment of a dynamic shutter.

TABLE OF CONTENTS

| | Column |
|---|---|
| I. First simplified embodiment with optical multiplexing and optical de-multiplexing | 3 |
| II. Second simplified embodiment with optical multiplexing and electrical de-multiplexing | 6 |
| III. Continuous dynamic shutter: General | 7 |
| IV. Continuous dynamic shutter first embodiment: Mechanical spring | 9 |
| V. Continuous dynamic shutter second embodiment: Rotating grating | 9 |
| VI. Continuous dynamic shutter third embodiment: Fresnel patterns on belts | 10 |
| VII. Continuous dynamic shutter fourth embodiment: Fresnel patterns on cylinders | 11 |
| VIII. Character recognition: General | 11 |
| IX. Explanation of why system is shift invariant | 13 |
| X. Character recognition logic | 14 |
| XI. Two dimensional frequency assignment | 16 |
| XII. Examples of other possible embodiments | 16 |

I. *First simplified embodiment with optical multiplexing and optical de-multiplexing*

Figure 1:
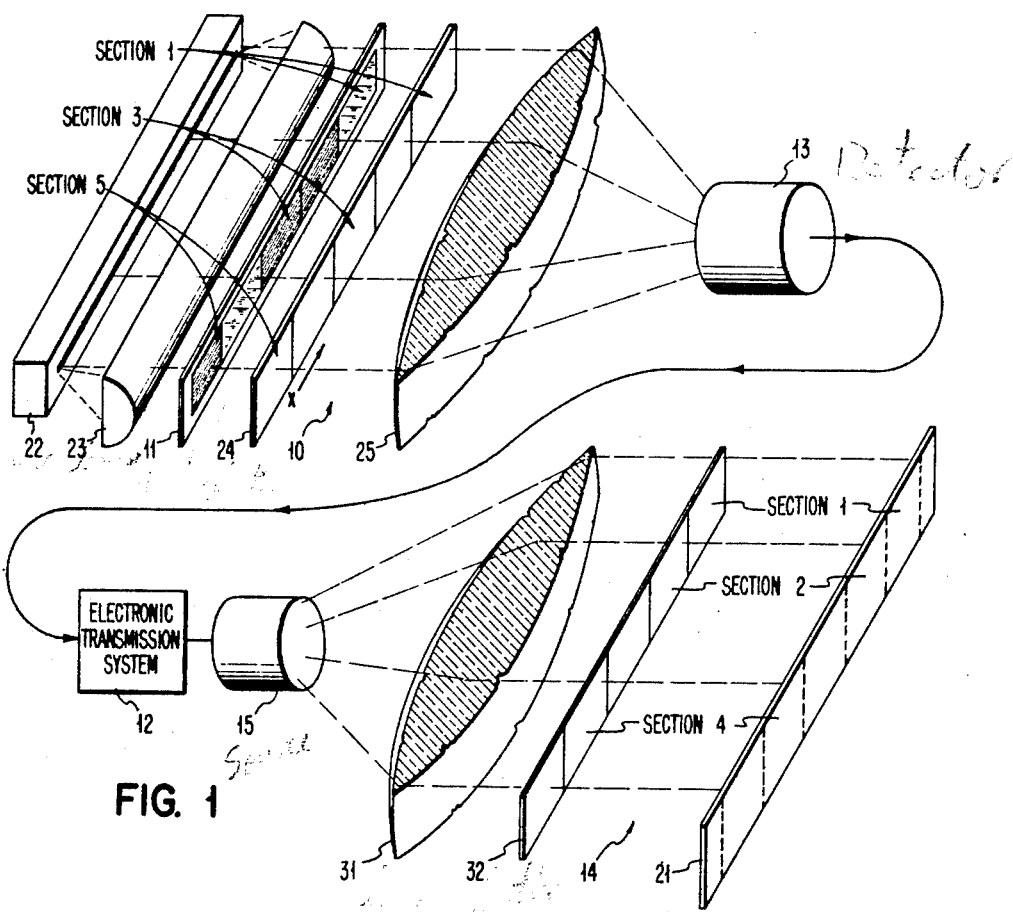
FIGURE 1 is an overall view of a first embodiment of the present invention.

A simplified embodiment which illustrates the principles of certain aspects of the present invention in a simplified, easily-understood manner is shown in FIGURE 1. This embodiment has limitations relative to cost and efficiency and does not illustrate all of the advantages which are inherent in other embodiments of the invention; however, it does serve as an introduction and tutorial tool. More sophisticated embodiments of the present invention which have further advantages and features are explained in detail later.

The embodiment of the invention shown in FIGURE 1 is an image transmission system. It includes a record 11, a screen 21, a multiplexor 10, a photodetector 13, an electronic transmission system 12, a light source 15, and a demultiplexor 14. The system reproduces on screen 21 an image of the record 11. Record 11 is divided into five segments designated "1" to "5." Each segment of record 11 is either transparent or opaque, thereby indicating five binary bits of information. Sections "1" and "4" are transparent and sections "2," "3" and "5" are opaque. A transparent record indicates a binary "1" and an opaque record indicates a binary "0"; hence, the record shown in FIGURE 1 represents the binary information "10010." Naturally, the designation of a transparent area as a "1" and of an opaque area as a "0" is a purely arbitrary designation.

The multiplexor 10, the electronic transmission system 12 and the de-multiplexor or signal separator 14 are only shown schematically in FIGURE 1. The details of these components will be explained in detail later.

In general, the system operates as follows: The light passing through each transparent segment of record 11 is suitably modulated and combined by multiplexor 10. The combined light activates photodetector 13 which generates an electronic signal which is transmitted via electronic transmission system 12 to the light source 15. The various components in the light generated by source 15 are separated by de-multiplexor 14 and an image of record 11 is generated on screen 21. Photodetector 13, electronic transmission system 12, and light source 15 are conventional; hence, no further description thereof is given.

Multiplexor 10 includes a light source 22, a collimating lens 23, a dynamic shutter 24 and a condensing lens 25. Dynamic shutter 24 has five sections, one corresponding to each section of record 11. Light source 22 and collimating lens 23 direct parallel light at record 11. The light which passes through the transparent segments of record 11 is directed at dynamic shutter 24 and the light which passes through any section of dynamic shutter 24 is combined and directed at photodetector 13.

Figure 3:
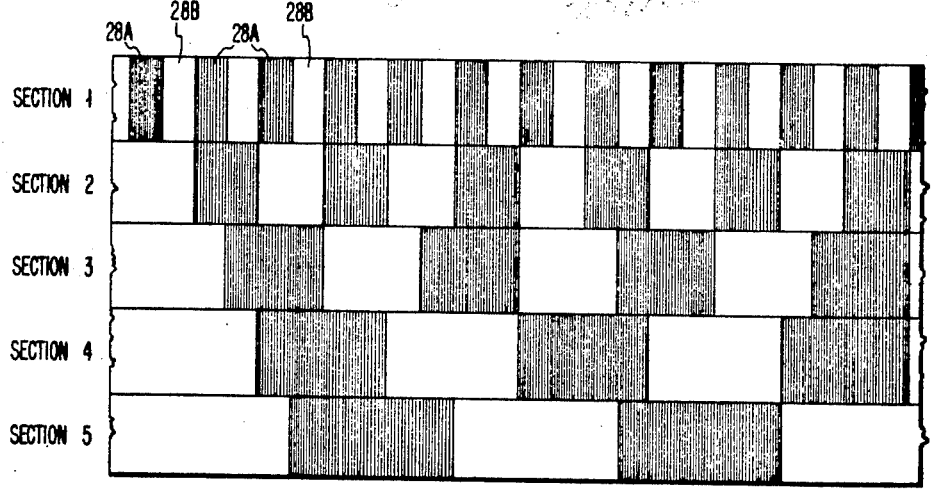
FIGURE 3 shows the details of the belt which is part of the dynamic shutter shown in FIGURE 2.
Figure 2:
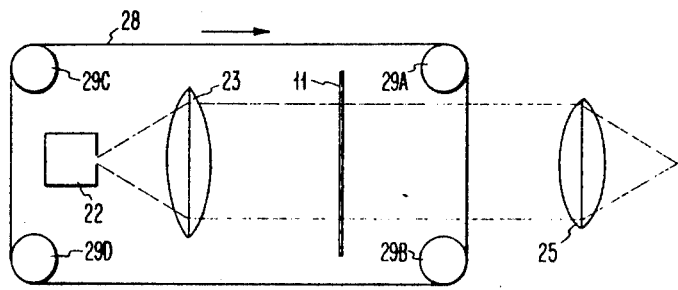
FIGURE 2 shows the details of the dynamic shutter shown in FIGURE 1.
Figure 4:
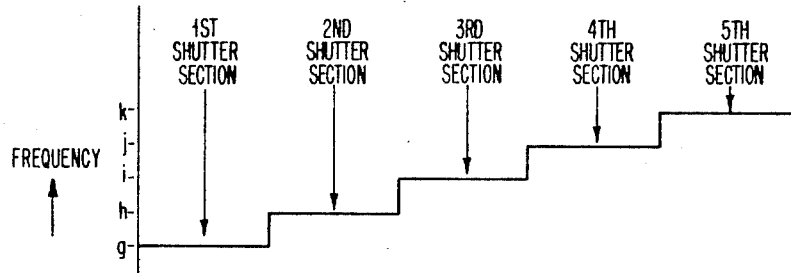
FIGURE 4 is a graph showing the frequency of the various portions of the dynamic shutter.

The mechanical details of dynamic shutter 24 and their physical position relative to the other components in the multiplexor 10 are shown in FIGURE 2. The dynamic shutter 24 includes a belt 28 wrapped around four pulleys 29A to 29D. The light source 22, the collimating lens 23 and the record 11 are located in the area enclosed by belt 28. Belt 28 is moved in the direction indicated by the arrows by a conventional drive mechanism (not shown). FIGURE 3 shows a top view of a portion of belt 28. The belt is divided into five strips numbered "1" to "5." These strips, which correspond in width to the sections of record 11, form the five different sections of dynamic shutter 24. Each strip of the belt has alternate opaque and transparent segments. The opaque segments are designated 28A and the transparent segments are designated 28B. The width and spacing of the segments in each strip of the belt differs. As belt 28 is rotated around pulleys 29A to 29D the area in front of each segment of record 11 is alternately opaque and transparent, thereby giving the effect of a shutter. Due to the different spacing between opaque and transparent areas in each strip of the belt, the frequency of each section of the shutter is different. FIGURE 4 shows the frequency of each section of the shutter. In order to show the correspondence in location between various components the distance along the record is designated as "x" and in FIGURE 4 and in certain other figures the horizontal coordinate is the distance "x." Hence, in FIGURE 4 the frequency of the dynamic shutter is shown as a function of the distance "x."

Figure 5:
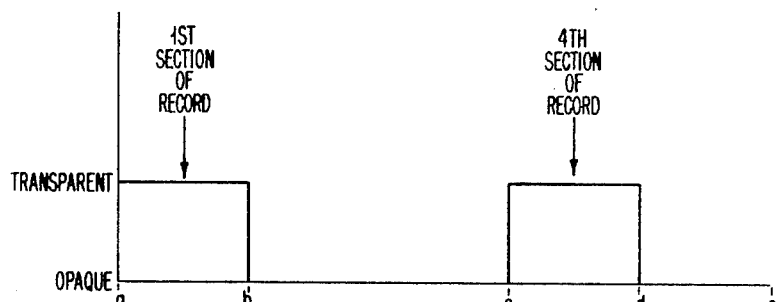
FIGURE 5 is a graph showing the transparency of each portion of the record shown in FIGURES 1 and 2.

FIGURE 5 is a graph wherein the transparency of record 11 is plotted as a function of the distance "x." FIGURE 5 indicates that the first section of record 11 (between positions "a" and "b") is transparent, that the second two segments of the record (between positions "b" and "c") are opaque, that the fourth section of the record (between locations "c" and "d") is transparent, and that the final section of the record is opaque.

Figure 7:
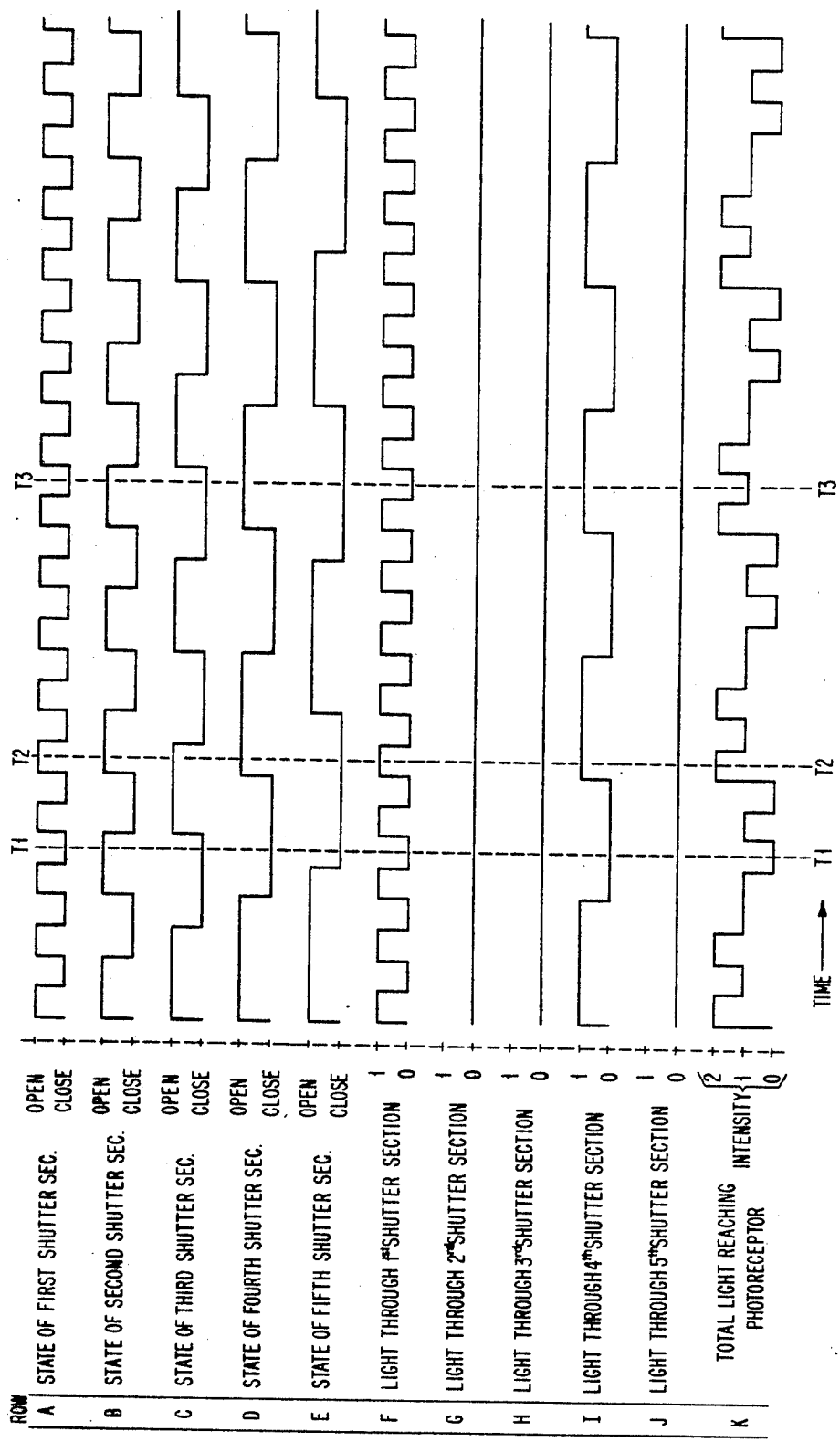
FIGURE 7 is a timing diagram showing the operation of the dynamic shutter.

FIGURE 7 (rows A to E) shows the condition of each section of dynamic shutter 24 plotted as a function of time. For example, FIGURE 7 shows that at time T1 shutter 1 is closed, shutter 2 is open, shutter 3 is closed, shutter 4 is closed and shutter 5 is closed. At time T2 shutter 1 is open, shutter 2 is open, shutter 3 is open, shutter 4 is open and shutter 5 is closed, etc.

Since each section of dynamic shutter 24 opens and closes at a different frequency, the light which passes through each section of shutter 24 is modulated at a different frequency. Only segments one and four of record 11 are transparent; hence, light only passes through sections one and four of dynamic shutter 24. Thus, the light arriving at photodetector 13 has two components. The first component is modulated at frequency "g" (see FIGURE 4), which is the frequency of shutter section 1, and the second component is modulated at frequency "j," which is the frequency of shutter section 4.

Figure 6:
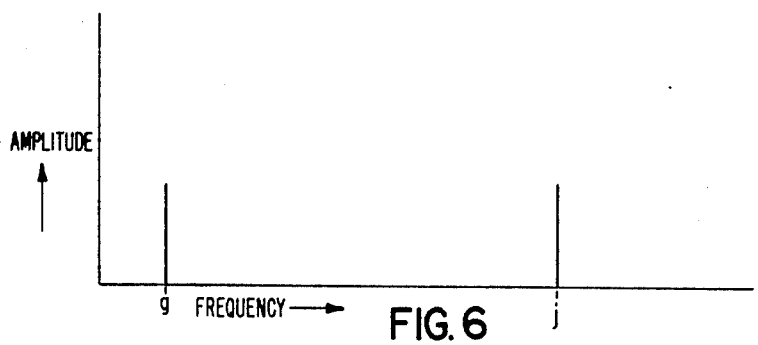
FIGURE 6 is a diagram showing the characteristics of the optical signal which passes through the dynamic shutter.

FIGURE 6 shows the amplitude of each component in the light reaching photodetector 13. In FIGURE 6 the amplitude of each component of the light is plotted as a function of frequency. It is noted that the components described above are not Fourier components since the modulation by shutter 24 is not sinusoidal. Furthermore, they represent the frequency of modulation and not the frequency (color) of the light which passes through each area of the record. The actual frequency (color) of the light is irrelevant.

Rows F to G in FIGURE 7 show the light which passes through each section of the dynamic shutter 24 as a function of time and row K in FIGURE 7 shows the intensity of light arriving at photodetector 13 with respect to time. For example, at time T1 both sections 1 and 4 of shutter 24 are closed; hence, no light arrives at photodetector 13. At time T2 both sections 1 and 4 of shutter 24 are open; hence, the light arriving at photodetector 13 has an intensity of two. At time T3, section 1 is closed and section 4 is open; hence, the light arriving at photodetector 13 has an intensity of one. Photodetector 13 generates an electrical signal which varies as does the intensity of the light arriving at the input of the photodetector. Hence, row K in FIGURE 7 also represents the amplitude of the signal in electronic transmission system 12. Light source 15 responds to the signal generated by electronic transmission system 12; hence, row K in FIGURE 7 also represents the intensity of the light generated by light source 15.

It is noted that FIGURE 7 indicates that the time required for each section of the shutter to open and close is zero. Naturally, this is not precisely true. However, the speed of rotation of belt 28 is fast with respect to the width of the various transparent and opaque segments thereon; hence, the transition time between transparency and opaqueness is practically instantaneous. Therefore, FIGURE 7 is for all practical purposes representative of the operation of the dynamic shutter 24.

Demodulator 14 includes a collimating lens 31 and a dynamic shutter 32 (FIGURE 1). Dynamic shutter 32 is identical in construction and synchronized with dynamic shutter 24; hence, no detailed description thereof is given. Rows A to E in FIGURE 7 describe the operation of dynamic shutter 32.

Figure 8:
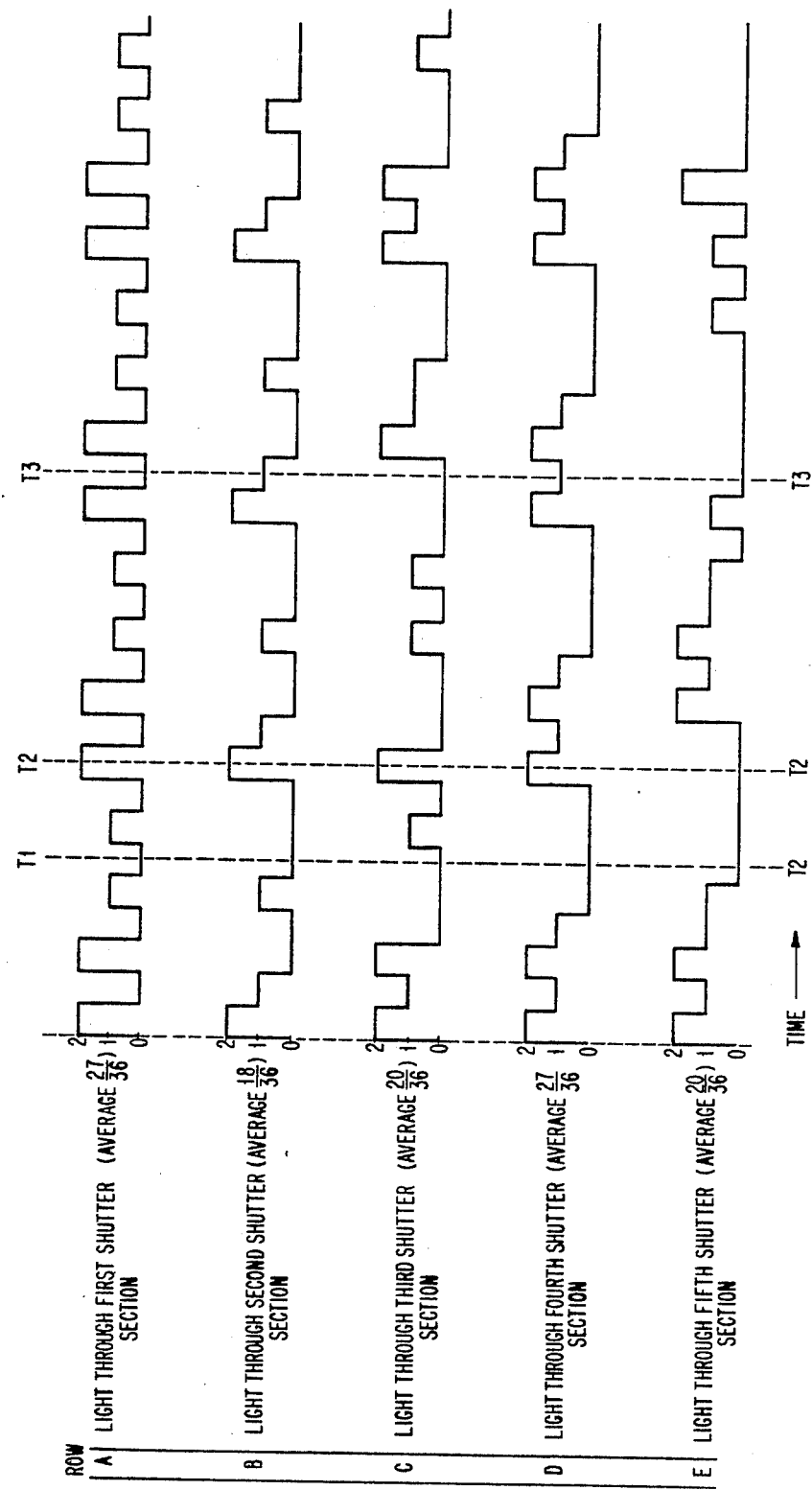
FIGURE 8 is a diagram showing the light which passes through the various portions of the dynamic shutter in the de-multiplexor.

FIGURE 8 shows the intensity of the light that passes through each of the five sections of dynamic shutter 32 with respect to time. The amount of light that passes through each section of shutter 32 at any particular time is dependent upon two factors. The first factor is whether or not the particular shutter is open and the second factor is the amount of light generated by light source 15 at the particular time. Whether or not any shutter is open at any particular time is shown by rows A to E in FIGURE 7. The amount of light generated by light source 15 is shown by row K in FIGURE 7. For example, at time T1 light source 15 is entirely off; hence, no light passes through any of the sections of shutter 32. At time T2 light source 15 generates light having two units of intensity. However, at time T2 shutter sections 1, 2, 3 and 4 are open and shutter section 5 is closed (see rows A to E in FIGURE 7). Thus, at time T2 two units of light pass through shutter sections 1, 2, 3 and 4 and no light passes through the shutter section 5. This is shown in FIGURE 8 rows A to E.

The intensity of the light on each portion of screen 21 is represented by the time average of the intensity of light passing through the corresponding section of shutter 32. For example, the light reaching section 1 of screen 21 is the time average of the light passing through section 1 of shutter 32. The amount of light reaching section 2 of screen 21 is the time average of the light passing through section 2 of shutter 32, etc.

The time average of the light passing through the various sections of shutter 32 can be very easily obtained graphically from FIGURE 8. The results are tabulated below:

Shutter section No.:

| | Time average of light passing through |
|---|---|
| 1 | 27/36 |
| 2 | 18/36 |
| 3 | 20/36 |
| 4 | 27/36 |
| 5 | 20/36 |

The above figures clearly show that the intensity of the light reaching sections "1" and "4" of screen 21 is greater than the intensity of the light reaching the other sections of screen 21. Thus, the light on screen 21 represents an image of the record 11 and the information in record 11 has been transmitted to screen 21.

Of particular significance is the fact that the light passing through a plurality of areas in record 11 was simultaneously picked up by a single photodetector 13. Thus, the signal from the various areas of record 11 were multiplexed. Thereafter, this multiplexing signal was demultiplexed or separated and the image recreated. Thus, FIGURE 1 illustrates an optical multiplexing and de-multiplexing system. The further embodiments described hereinafter show how the general principle of optical multiplexing can be advantageously applied to character recognition systems.

II. *Second simplified embodiment with optical multiplexing and electrical de-multiplexing*

Figure 9:
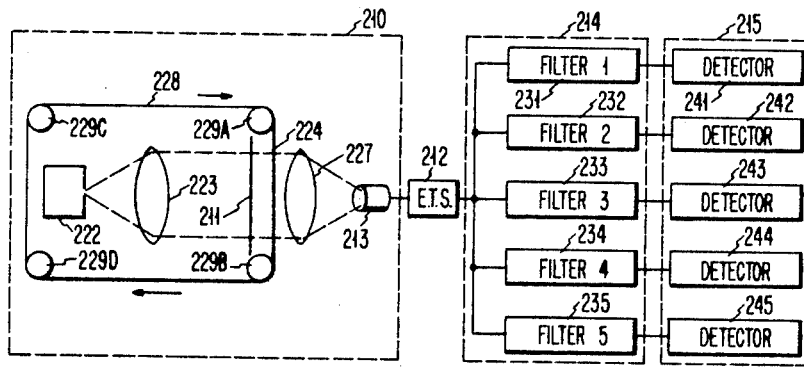
FIGURE 9 is an overall view of an alternate embodiment of the invention.

FIGURE 9 shows a second embodiment of the present invention. In the first embodiment both the multiplexing and the de-multiplexing were done optically. In the second embodiment the multiplexing is done optically but the de-multiplexing is done electronically.

Figure 11:
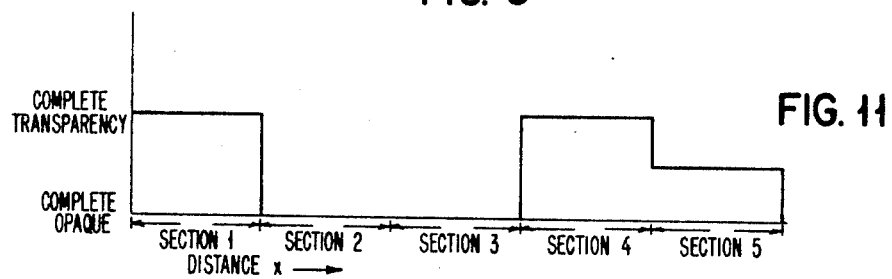
FIGURE 11 is a diagram showing the characteristics of the record shown in FIGURE 9.

The second embodiment, as shown in FIGURE 9, includes a multiplexor 210, which reads a record 211, a transmission system 212, a de-multiplexor 214 and a receiver 215. Receiver 215 includes a plurality of detectors 221 to 225. Multiplexor 210 reads signals from a record 211 which has five sections similar to the record 11 shown in FIGURE 1. The particular sections of record 211 which are transparent are shown in FIGURE 11. As shown in FIGURE 11, sections "1" and "4" of the record 211 are completely transparent and section "5" is semi-transparent. The only difference between multiplexor 210 and the multiplexor shown in FIGURE 2 is with respect to the transparency of belt 228. Belt 28 shown in FIGURE 3 has abrupt transitions between transparent and opaque areas. Belt 228 has no abrupt transitions between the transparent and opaque areas.

Figure 10:
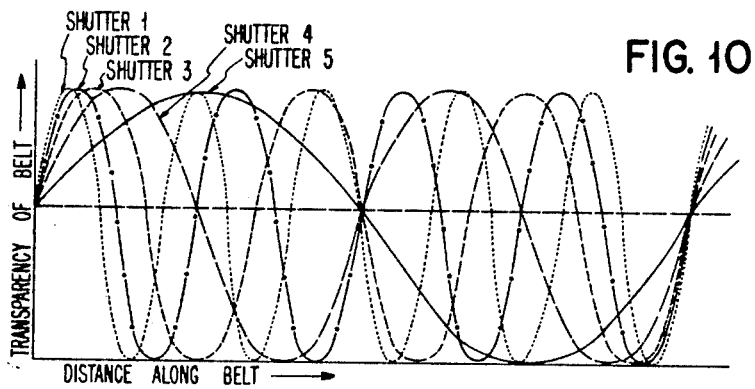
FIGURE 10 is a graph which shows the characteristics of the belt in the dynamic shutter shown in FIGURE 9.
Figure 12:
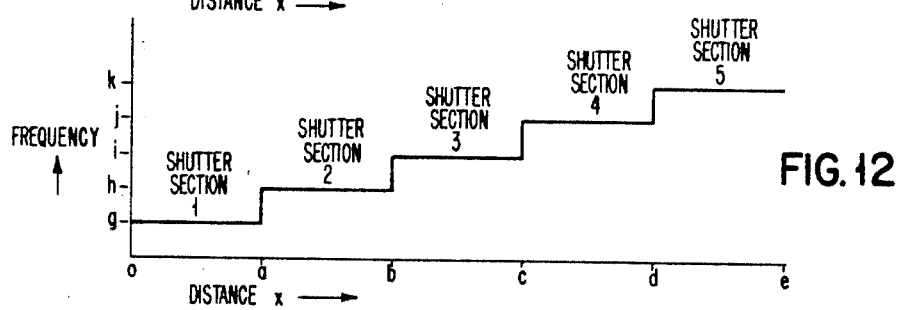
FIGURE 12 shows the frequency of various portions of the dynamic shutter shown in FIGURE 9.

Belt 228, like belt 28, is divided into five strips, one corresponding to each section of record 211. The transparency of each strip varies sinusoidally with respect to distance and the frequency of variation for each strip is different. The variation of transparency with respect to distance of each strip of belt 228 is shown in FIGURE 10. The frequency of each section of dynamic shutter 224 as belt 228 rotates is shown in FIGURE 12. The fundamental difference between dynamic shutter 224 (FIGURE 9) and dynamic shutter 24 (FIGURE 2) is that with dynamic shutter 24 the transition between the closed and open states is abrupt, whereas with dynamic shutter 224 the transition between opaque and transparent states varies sinusoidally.

Figure 13:
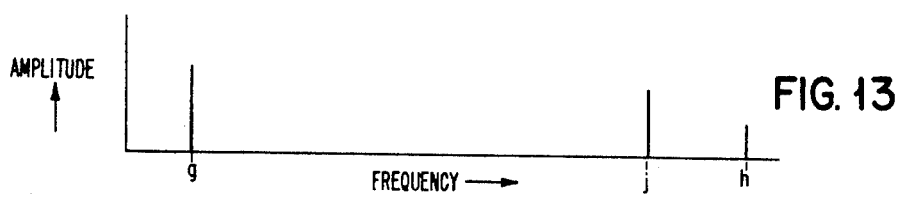
FIGURE 13 shows the amplitude of each of the Fourier components of the signal generated by the photodetector shown in FIGURE 9.

Since only sections "1," "4" and "5" of record 211 are transparent to any degree (see FIGURE 11), light from light source 222 only reaches sections "1," "4" and "5" of dynamic shutter 224. All of the light passing through dynamic shutter 224 is focused by condensing lens 227 and it reaches photodetector 213. Photodetector 213 generates an electrical signal which corresponds in amplitude to the optical signal at its input. The light reaching photodetector 213 has three components which are respectively modulated frequencies $g$, $j$, and $k$ which are the frequencies of shutter sections "1," "4," and "5" (see FIGURE 12). The frequency spectrum of the light reaching photodetector 213 is shown in FIGURE 13. Since the fifth section of record 211 is only semi-transparent, the amplitude of the component at frequency $k$ is only half the amplitude of the other components. Each of these components varies sinusoidally, due to the fact that the transparency of belt 228 varies sinusoidally; hence, the three components in the signal are equivalent to the Fourier components of the signal. Since the electrical transmission system 212 responds to the output of detector 213, the electrical signal transmitted by network 212 also has three components at frequencies $g$, $j$ and $k$. The de-multiplexing network 214 includes five filters 231 to 235. Each of these filters is an electronic bandpass filter. The center of the passband of each of the filters 231 to 235 is equal to the frequency of one of the sections of dynamic shutter 224. Thus, the passband of filter 231 is centered at the frequency $g$, the passband of filter 232 is centered at frequency $h$, the passband of filter 233 is centered at frequency $i$, the passband of filter 234 is centered at frequency $j$, and the passband of frequency of filter 235 is centered at frequency $k$. The width of each passband must be less than the distance between the various frequencies.

As previously explained, the signal supplied to demultiplexor 214 has three frequency components which are at the frequencies $g$, $j$ and $k$. These three components will respectively pass through filters 231, 234 and 235. The output of each filter is connected to one of the detectors 241 to 245 in receiver 215. Each detector generates a visible (or otherwise detectable) signal which indicates the magnitude of the signal at the output of the associated filter. Hence, in the particular case illustrated in FIGURE 9 detectors 241 and 244 would indicate a signal of unit magnitude and detector 245 would indicate a signal of a half-unit of magnitude.

A signal can, therefore, be transmitted from multiplexor 210 to receiver 215 indicating that sections "1" and "4" of record 211 are totally transparent and that section "5" is semi-transparent. In summary, in the embodiment shown in FIGURE 9, signals from a plurality of areas of record 211 were optically multiplexed to a single photodetector 213. The multiplexed signal was thereafter electronically de-multiplexed by de-multiplexor 214 and transmitted to receiver 215.

III. *Continuous dynamic shutter: General*

Figure 14:
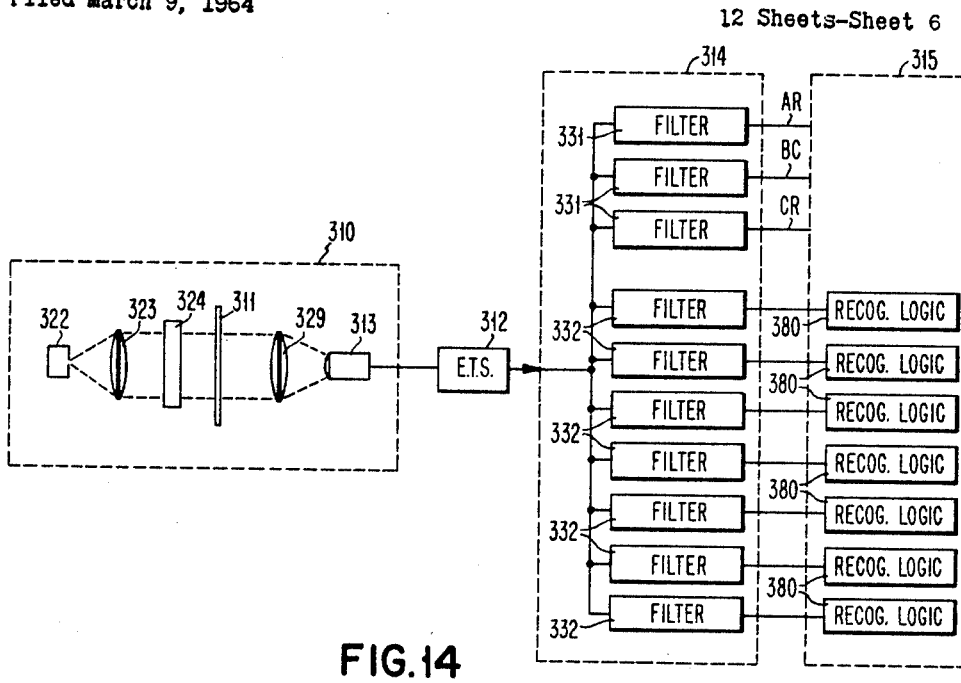
FIGURE 14 is an overall schematic diagram of a third embodiment of the invention.

A third embodiment of the present invention is shown in FIGURE 14. The third embodiment includes a multiplexor 310, an electronic transmission system 312, a de-multiplexor 314 and a character recognition device 315.

Figure 15:
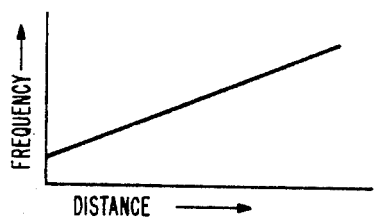
FIGURE 15 shows the characteristics of the dynamic shutter shown in FIGURE 14.

Multiplexor 310 includes a light source 322, a collimating lens 323, a record 311, a dynamic shutter 324, condensing lens 329, and a photodetector 313. There is a fundamental difference between multiplexor 310 and the multiplexors in the previously explained embodiments. The multiplexors in the previously explained embodiments had a discrete number of sections, each of which operated at a particular frequency (see FIGURES 4 and 12), whereas dynamic shutter 324 makes a continuous assignment of frequency with respect to distance "$x$" (n.b., "$x$" is the distance along the record). The relationship between shutter frequency and distance is shown in FIGURE 15. In the previous embodiments the assignment of frequency with respect to distance "$x$" was a discontinuous step function (as shown in FIGURES 4 and 12), whereas as in this third embodiment the assignment frequency with respect to the distance "$x$" is a continuous straight line relationship (as shown in FIGURE 15). Thus, the light passing through each point in shutter 324 is modulated at a particular frequency. The particular frequency of modulation is a continuous function of the distance "$x$," as shown in FIGURE 15. A number of different embodiments of dynamic shutter 324, each of which has a response curve such as that shown in FIGURE 15, will be explained in detail later. However, a general discussion of the operation of the third embodiment will be given before the details of the various embodiments of dynamic shutter 324 are explained.

Figure 16:
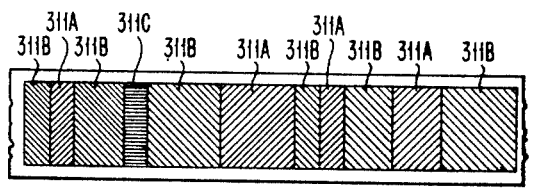
FIGURE 16 shows the details of the record shown in FIGURE 14.

The details of a particular record 311 are shown in FIGURE 16. Similar to the record used in the previously explained embodiments, record 311 has transparent and opaque areas. However, in the previous embodiment the records were limited to a discrete number of sections, each of which corresponded to one of the sections of the dynamic shutter. Dynamic shutter 324 is not divided into sections and there is no significance to the location of the lines where the transparency of record 311 changes. The areas of record 311 designated 311A are totally transparent, the areas designated 311B are totally opaque and the areas designated 311C are semi-transparent; that is, the area designated 311C transmits one-half of the light incident thereon.

Record 311 is positioned behind dynamic shutter 324 whereas in the previously explained embodiments the record is positioned in front of the dynamic shutter. Whether the record is in front or behind the dynamic shutter is irrelevant, since in both cases the light reaching the photoreceptor is modulated by both the dynamic shutter and the record.

Figure 18:
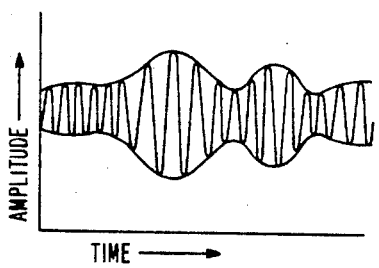
FIGURE 18 shows the waveform with respect to time of the signal generated by the photoreceptor shown in FIGURE 14.
Figure 17:
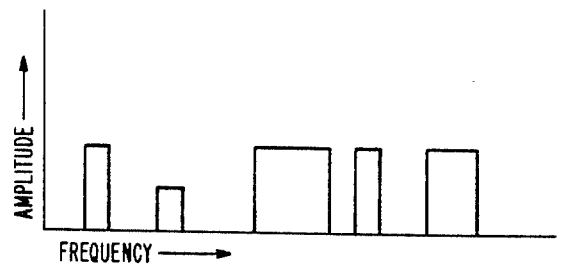
FIGURE 17 shows the frequency spectrum of the signal generated by the photoreceptor shown in FIGURE 14.

The frequency spectrum of the light reaching photodetector 331 is shown in FIGURE 17. The light passing through each transparent area of record 311 contains a certain band of frequencies. This is in contrast to the first embodiment wherein the light passing through each transparent area of the record was all modulated at one particular frequency. This distinction can be seen by comparing FIGURES 13 and 17. FIGURE 13 shows three lines corresponding to the modulation frequencies of the light which passed through the three transparent areas in record 211. FIGURE 17 shows five bands of frequencies corresponding to the five transparent areas of record 311. As with similar FIGURES 6 and 13, FIGURE 17 shows the frequency at which the light is modulated. These figures do not relate to the frequency (color) of the light. Photodetector 313 generates an electrical signal in response to the light incident thereon; hence, FIGURE 17 also represents the frequency spectrum of the electrical signal transmitted by the electrical transmission system 312. Since the modulation is sinusoidal, the frequency components shown are the same as the Fourier components of the electrical signal. The signal in electrical network 312 appears as a modulated carrier of the type shown in FIGURE 18. The actual shape of the signal in network 312 in the time domain will be discussed in detail later.

De-multiplexor 314 includes a plurality of bandpass filters which are divided into two groups. The filters in the first group are designated 331 and the filters in the second group are designated 332. The reason for this division will be explained in detail later. Character recognition device 315 includes a plurality of logical circuits 380. These circuits will be explained later.

The details of various embodiments for dynamic shutter 324 will now be explained. FIGURES 19, 21, 23 and 25 show four different embodiments for dynamic shutter 324. Each of these dynamic shutters has a characteristic such as that shown in FIGURE 15. The dynamic shutters shown in FIGURES 19, 21, 23 and 25 will be termed continuous dynamic shutters and they are respectively designated as dynamic shutters 324A, 324B, 324C and 324D.

IV. *Continuous dynamic shutter first embodiment: Mechanical spring*

Figure 19:
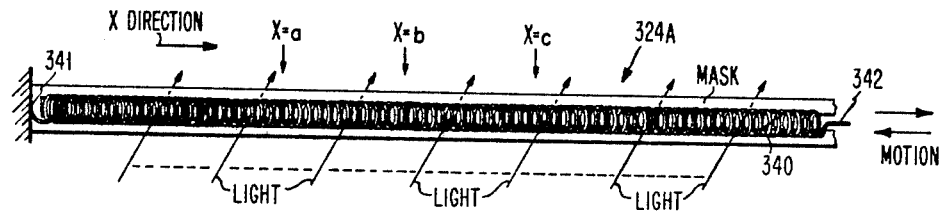
FIGURE 19 shows another embodiment of a dynamic shutter.
Figure 20:
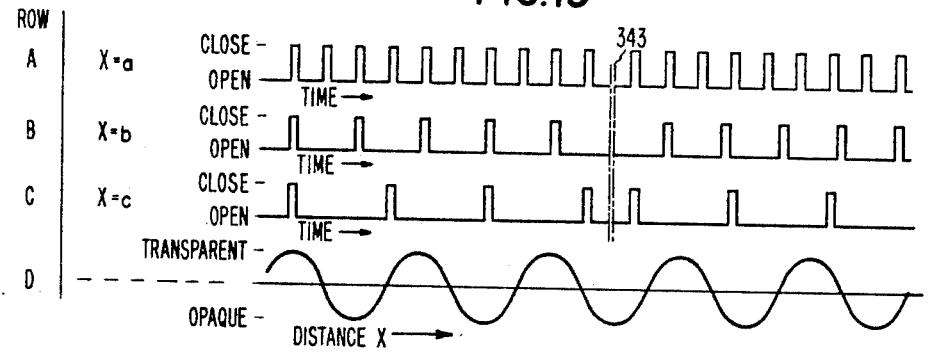
FIGURE 20 is a graph which explains the operation of the dynamic shutter shown in FIGURE 19.

Shutter 324A shown in FIGURE 19 consists of a coil spring 340 having two ends 341 and 342. End 341 is firmly attached to a stationary support and end 342 is moved back and forth. The spring which forms the dynamic shutter is positioned as shown in FIGURE 14 so that light shines through the spring. At each point along the spring in the "x" direction the light is interrupted at a different frequency. FIGURE 20 shows the interruption frequency at three points a, b and c along the spring. It is evident that at those points, which are closer to end 341, the interruption frequency is higher, and at the points which are closer to end 342 the interruption frequency is lower. A change in direction of end 342 is indicated by line 343. The change in direction causes a discontinuity in the shutter frequency. As will be seen later, this discontinuity can serve as a convenient time reference point.

Dynamic shutter 324A (FIGURE 19) is a simplified embodiment of dynamic shutter 324 and it has many practical disadvantages. However, it is shown and described as an introduction to the more complicated and sophisticated embodiments shown in FIGURES 21, 23 and 25. With dynamic shutter 324A shown in FIGURE 19 the change from transparency to opaqueness, and vice versa, caused by the coils of the spring are abrupt. A sinusoidal variation between the opened and closed condition could be obtained by replacing spring 340 with a stretchable membrance, the transparency of which is a sinusoidal function of the distance "x." The membrane would have a transparency as a function of distance, as shown in row D of FIGURE 20. As with spring 340, one end of the membrane would be fixed and the second end would be moved back and forth. At each point there would be a sinusoidal variation in transmissivity through the membrane. The frequency of the variation in transparency would vary with distance along the membrane, as explained above with respect to spring 340

In summary, with a dynamic shutter constructed as described above, the frequency of the shutter is a continuous function of the distance "x" as shown in FIGURE 15. If a coil spring is used as shown in FIGURE 19, the transition between open and closed conditions of the shutter are abrupt; however, if a stretchable membrane having a sinusoidally varying transmissivity is used, the transitions between the open and closed conditions of the shutter would be sinusoidal. Mask 338 insures that the only light which reaches photodetector 313 is light which passed both through the record and through the dynamic shutter.

V. *Continuous dynamic shutter second embodiment: Rotating grating*

Figure 21:
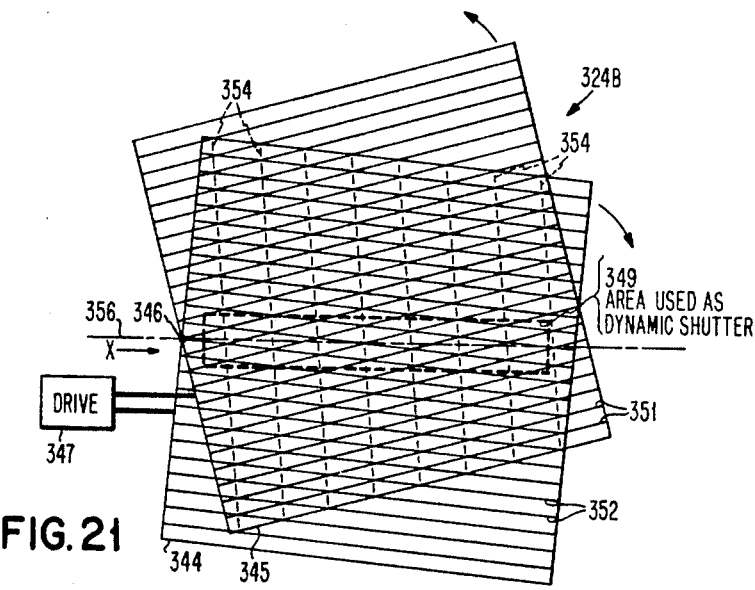
FIGURE 21 shows another embodiment of a dynamic shutter.
Figure 22:
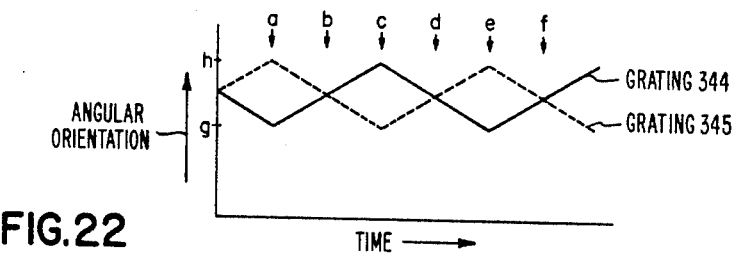
FIGURE 22 is a diagram which shows the motion of the components of the dynamic shutter shown in FIGURE 21.

A second alternate embodiment of dynamic shutter 324 is shown in FIGURE 21. This embodiment of shutter 324 is designated 324B. It consists of two diffraction gratings 344 and 345. Each of these diffraction gratings consists of a transparent medium with a plurality of finely-ruled opaque lines thereon. Such gratings are well known. The two gratings are rotatably mounted around a pivot point 346. A drive mechanism 347 is mechanically attached to the gratings and it rotates the gratings in opposite directions, as shown in FIGURE 22. The light would be directed at shutter 324B in a direction perpendicular to the face of drawing 21.

It is known that two diffraction gratings which are oriented in different directions produce Moire fringes. Lines 351 represent the ruled lines on grating 345 and lines 352 represent the ruled lines on grating 344. The dotted lines 354 represent the Moire fringes. When the two gratings are rotated in opposite directions about pivot point 346, the spacing between the Moire fringes changes. At each point across the structure on the axis 356 the transparency of the entire structure varies sinusoidally. The frequency of the sinusoidal variations is different at each point along the axis 356. The frequency of variation of the transparency is a function of the distance "x" along axis 356, as shown in FIGURE 15. The mathematical expression which defines the transparency of dynamic shutter 324B at any point along the line 356 is given below:

$$T(x) = \cos[2\pi R(x-x_0)]$$

$$R = \frac{2wt}{d}$$

where:

$T$ = transparency
$x$ = distance
$x_0$ = coordinate of pivot point
$t$ = time
$w$ = speed of rotation
$d$ = line spacing The above expression ignores a constant term and certain higher order harmonic terms; however, these terms merely appear as noise and they do not affect the overall operation of the device. The opaque lines in most commercially available gratings have relatively sharp edges and as a result the function which expresses the transparency is triangular rather than sinusoidal; that is, the expression for transparency includes higher order harmonic terms. The higher order terms can be eliminated by using gratings wherein the transparency varies sinusoidal rather than merely having opaque lines. Furthermore, the higher order harmonics are minimized if the total amount of rotation before the direction of rotation is reversed and is limited to 15 degrees. That is, if the distance between points g and h in FIGURE 22 is 15 degrees.

At each point where the direction of rotation of the grating is reversed, that is, at points a, b, c, d and e in FIGURE 22, the variation in transparency is naturally discontinuous. These points are equivalent to a phase reversal and, as will be seen later, they serve as convenient time reference points. The spacing between lines 351, 352 and 354 is greatly exaggerated in the drawing for ease of illustration. A mask (not shown) covers all of the area except that designated 349 to insure that light only passes through the portion of the gratings near line 356.

VI. *Continuous dynamic shutter third embodiment: Fresnel patterns on belts*

Dynamic shutter 324C (FIGURE 23) includes two moving belts 366 and 369. The transparency of each belt varies as the transparency of a Fresnel zone plate. A Fresnel zone plate is a well known device. A segment of belt 366 and a segment of belt 369 are shown in perspective in FIGURE 24. The transparency of each belt is given by the following mathematical expression:

$$T(x) = 1 + \cos(2\pi a x^2)$$

where:

$T$ = transparency
$x$ = distance
$a$ = constant which defines the pattern

When the two belts are moved in opposite directions, the product of their transparency is a function which varies sinusoidally. The frequency of variation is a function of the distance "x." Expressed mathematically, the transparency of the two belts moving in opposite directions is approximately given by the following expression:

$$T \cong 1/2 \cos(8\pi a v t x)$$

where:

$T$ = transparency
$a$ = a constant which defines the Fresnel patterns which are used $v$ = velocity
$t$ = time
$x$ = distance The above expression ignores certain terms which are not relevant to the present discussion. These other terms merely represent the equivalent of noise.

Belt 366 is mounted on pulleys 367A, 367B and 367C and a belt 369 is mounted on pulleys 370A, 370B, 370C, 370D and 370E. Belts 366 and 369 are driven in opposite directions (as indicated by the arrows) by conventional drive means (not shown). Belts 366 and 369 are equal in length and both of the belts have the same number of Fresnel type patterns thereon. There are discontinuities equivalent to a phase reversal on the belts at the points where each pattern ends and the next pattern begins. Points $j$ and $k$ are examples of these discontinuities. The light source 322 and the record 311 are located within the area enclosed by the belts and the light shines through the belts, the belts constituting dynamic shutter 324. The direction "$x$" is indicated in the figure.

The length of each Fresnel pattern on the belts is longer than the length of record 311. For convenience of illustration this is not shown in FIGURE 24. This is an essential requirement in order to insure that the same modulation frequency is not assigned to two locations on the record.

VII. *Continuous dynamic shutter fourth embodiment: Fresnel patterns on cylinders*

Dynamic shutter 324D consists of two concentric cylinders which are rotated in opposite directions by a conventional drive (not shown). The transparency of each cylinder is in accordance with the Fresnel formula given above. A prism 375 is located in the center of the two cylinders.

Light is first directed through the record 311 and then through the two cylinders. This light is incident upon prism 375 which directs the light out of the end of the cylinders to the photoreceptor 313. The two rotating cylinders produce a dynamic shutter, the frequency of which varies along the distance "$x$," similar to the manner explained above relative to dynamic shutter 324C.

One of the major disadvantages of shutter 324D is that it has a relatively narrow field of view. If the field is extended for any substantial distance in the "$x$" direction, problems are encountered due to the curvature of cylinders 372 and 373. Naturally, this can be somewhat offset by using relatively large cylinders or compensating the optical system. The effect of the curvature is to make the assignment between frequency and distance "$x$" non-linear. In certain cases this in itself may be a desirable objective.

VIII. *Character recognition: General*

Each of the records thus far described only contain either binary or tertiary information. That is, the previously described records have areas which were either opaque, transparent, or semi-transparent. As will now be described, the present invention can also be applied for the recognition of more complicated characters.

Figure 26:
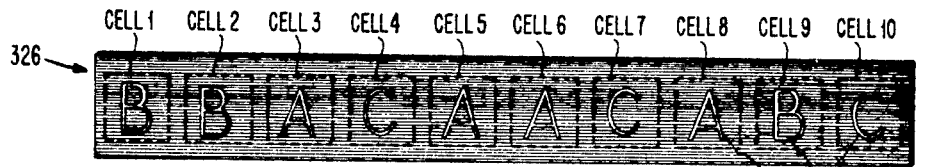
FIGURE 26 shows a record having a plurality of characters thereon.

FIGURE 26 shows a record 326 which is divided into ten character cells. Each character cell has an arabic letter therein. The main body of record 326 is opaque; however, the lines which form the various characters are transparent. As will be explained in detail later, the last three character cells are used for reference characters; hence, the record has only seven information bearing character cells.

Figure 27:
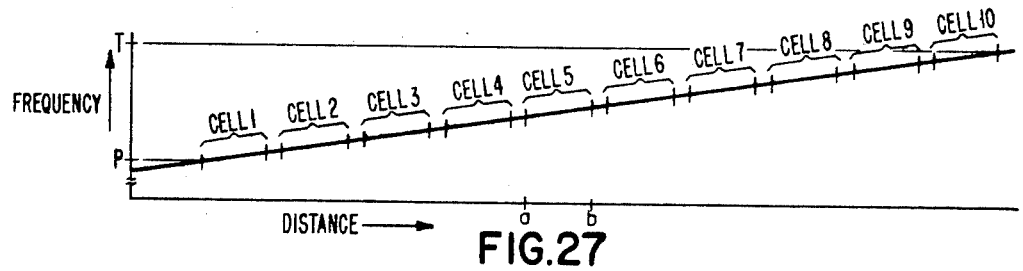
FIGURE 27 shows the frequencies assigned to each character cell in the record shown in FIGURE 26.

Record 326 can be read by the system shown in FIGURE 14. The system shown in FIGURE 14 includes a multiplexor 310, a transmission system 312, and a de-multiplexor 314. The multiplexor 310 and the transmission system 312 have been previously explained. De-multiplexor 314 includes ten filters, one of which is assigned to each character cell. FIGURE 27 is a diagram which shows the band of frequencies which is assigned to each character cell by optical multiplexor 310. It is noted that there is a small band of unassigned frequencies between each of the cells. The passband of each filter in de-multiplexor 314 is the same as the frequencies assigned to the associated character cell. The actual range of frequencies used in the system is not important relative to the principles of the invention; however, greater accuracy can be obtained by using the widest possible band of frequencies. The actual band of frequencies used in any system will probably be determined by cost consideration. By way of example, for the system shown in FIGURE 14, using the dynamic shutter shown in FIGURE 21 and reading a record such as that shown in FIGURE 26 which is 200 millimeters wide, the frequency band between 1 to 80 kilocycles could be used. That is, in FIGURE 27 point "$p$" would represent 1 kilocycle and point "$t$" would represent 80 kilocycles. The frequency band assigned to each character cell would then be seven kilocycles wide and the unused band between adjacent cells would be one kilocycle wide. This frequency range could be obtained with gratings 344 and 345 which are approximately 230 millimeters wide, the pivot point 346 being located 20 millimeters to the left of the end of the record. Each grating would have 20 opaque lines per millimeter and they would have to be rotated at a speed of approximately 600 revolutions per minute. Such a system could recognize characters consisting of lines which are approximately one-tenth of a millimeter wide.

The operation of de-multiplexor 314 and how it operates in order to recognize what particular characters are on record 326 will now be explained.

FIGURES 28 to 35 will be used to explain the nature of the signals which are generated at the output of the filters when various types of characters are located in the associated character cell of the record.

Figure 28:
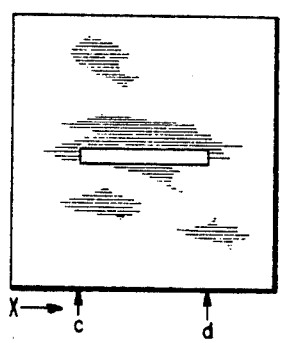
FIGURE 28 shows an enlarged view of one character cell having a particular mark therein.
Figure 29:
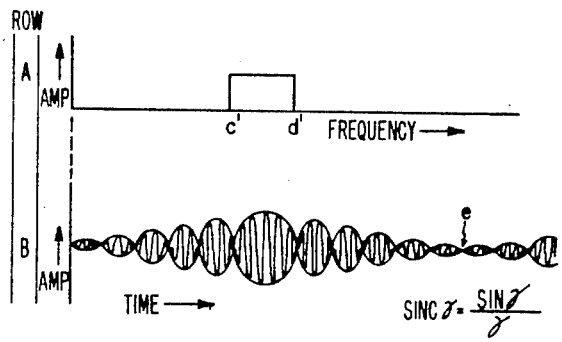
FIGURE 29 shows the response of the system to the character cell shown in FIGURE 28.

FIGURE 28 shows an enlarged character cell with one horizontal line therein. The major portion of the cell is opaque and the area which forms the horizontal line is transparent. FIGURE 29 shows the output of the associated filter both in the frequency domain and in the time domain. In the frequency domain the output of the associated filter appears as a relatively wide band of frequencies. The amplitude of the frequencies is relatively small. The reason for this is that the only light which reaches photodetector 313 through the character cell shown in FIGURE 28 is the light which passes through the transparent horizontal line. At each point "$x$" along the transparent line the modulation frequency of the light is different; hence, a relatively small amount of light at each frequency passes through the record. However, there is a relatively wide span in frequencies between points "$c$" and "$d$," the beginning and end of the line. Thus, there is a relatively wide band of frequencies; however, the amplitude of each component is relatively low. In the time domain the output of the filter appears as a "sinc" function, as shown in the second row of FIGURE 29. The fact that the signal will appear as a sinc function in the time domain is known because it is known that the Fourier transform of a band of frequencies is a sinc function. As previously explained, each of the scanning devices has a discontinuity which amounts to a phase reversal. The effect of the phase reversal on the output of the filters can be noted in the sinc function at points "$e$" and "$f$."

Figure 30:
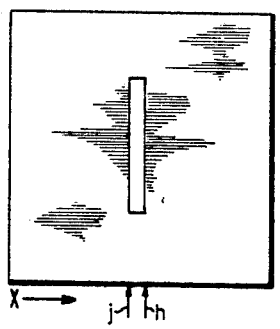
FIGURE 30 shows an enlarged view of a character cell having a particular mark thereon.
Figure 31:
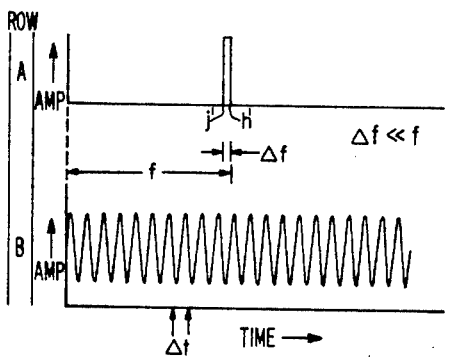
FIGURE 31 shows the response of the system to the character cell shown in FIGURE 30.

FIGURE 30 shows another enlarged character cell having a relatively narrow vertical line therein. All of the cells except the vertical line is opaque. The $x$ coordinates of the sides of the character are designated $j$ and $k$ as shown in FIGURE 30. The output of the associated filter will have a frequency spectrum, as shown in the first row of FIGURE 31. That is, a narrow band of frequencies will pass through the transparent line and these frequencies will have a relatively large amplitude. The frequencies corresponding to points $j$ and $k$ are designated $j'$ and $k'$ in FIGURE 31. In the time domain the signal at the output of the associated filter will appear as a relatively constant modulated wave. This is shown on row B of FIGURE 31. Actually, the wave in the time domain is a sinc function; however, the period of the modulation is very long and, hence, the envelope of the wave appears to have a constant amplitude. The reason for this is that the difference between frequencies $j'$ and $k'$ (see FIGURE 30) and the actual frequency $j'$ and $k'$ is very large.

Figure 32:
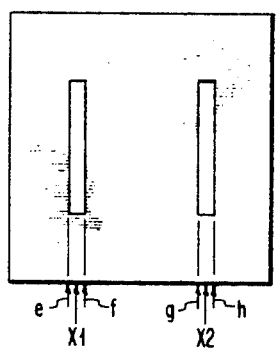
FIGURE 32 shows a character cell having a particular mark therein.
Figure 33:
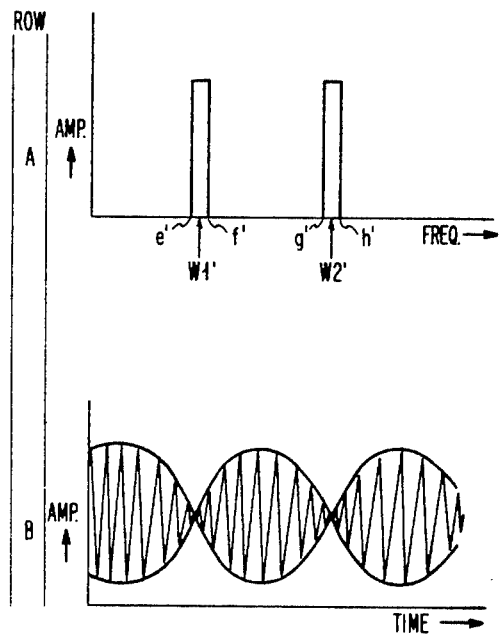
FIGURE 33 shows the response of the system to the mark shown in FIGURE 32.

FIGURE 32 shows an enlarged character cell having two vertical lines therein. The $x$ coordinate of the sides of the lines are designated $e$, $f$, $g$ and $h$. The output of the associated filter shown in FIGURE 33, wherein the frequencies assigned to the $x$ coordinates $e$, $f$, $g$ and $h$ are designated $e'$, $f'$, $g'$ and $h'$. Each line in the character cell produces a narrow band of frequencies of relatively large amplitude. The output of the filter in the time domain is shown in the row B of FIGURE 33. It appears as a modulated carrier. The frequency of modulation is equal to the difference in frequency between points W1 and W2.

Figure 34:
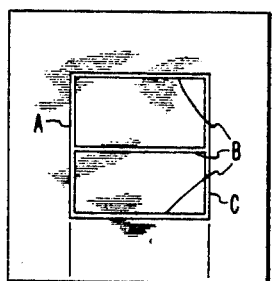
FIGURE 34 show a character cell having a particular character therein.

FIGURE 34 shows an enlarged view of a character cell which has a transparent numeral 8 therein. The frequency spectrum of the signal at the output of the associated filter is shown in the first row of FIGURE 33. The $x$ coordinates of the sides of the character are character are designated $l$ and $m$ and the corresponding frequencies are designated $l'$ and $m'$.

Figure 35:
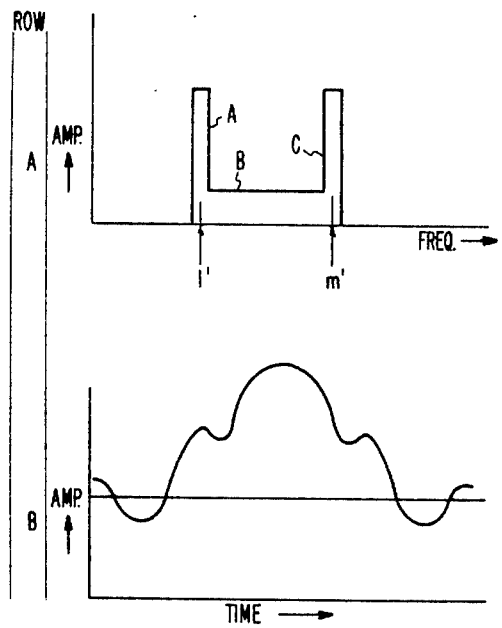
FIGURE 35 shows the response of the system to the character shown in FIGURE 34.

The frequency spectrum shown in FIGURE 35 has three parts which are respectively designated A, B and C. These three parts of the spectrum correspond to the three different parts of the character which are designated by the letters A, B and C in FIGURE 34. Row B in FIGURE 35 shows an approximation of the output of the associated filter in the time domain. The exact form of the signal could be obtained by taking the Fourier transform of the frequency spectrum shown in row A of FIGURE 35.

FIGURES 28 to 35 have shown that for each different character which appears in a character cell of the record the output of the associated filter will have a distinctive shape. Thus, by examining the shape of the signal at the output of the filters one can determine the particular characters which are located in each of the character cells of the record. Various types of circuits for examining the output of each filter in order to identify the characters in the various character cells will be explained later.

We will now show that the shape of the signal at the output of a filter is independent of the lateral position of a character within a cell.

IX. *Explanation of why system is shift invariant*

One of the important aspects of the character recognition system described herein is that within certain limits it is invariant to the position of a character within its associated character cell. That is, the same signal is generated irrespective of where a character is located in a character cell. The reason for this shift invariance will now be explained with reference to FIGURES 36, 37 and 38.

The output of each character cell is a band of frequencies. Depending upon which character is in a particular character cell, the amplitude of certain frequencies will be greater than the amplitude of other frequencies. This has already been explained with reference to FIGURES 28 to 34. We will now examine the effect of changing the location of the character shown in FIGURE 32. The two center frequencies associated with each half of the character are designated W1 and W2 and are shown in FIGURE 34. First, we will only consider the two frequencies W1 and W2 and then we will generalize using the theory of superposition. The frequency halfway between frequencies W1 and W2 is designated W0 (see FIGURE 36). The distance from frequency W0 to frequency W1 and the distance from frequency W0 to W2 is designated $y$. The sum of frequencies W1 and W2 (i.e., the signal which reaches the photodetector due to frequencies W1 and W2) is shown in FIGURE 37 and may be mathematically expressed as follows:

(1) $\cos(W0+y)t + \cos(W0-y)t$
$= 2[\cos(W0t)] \cdot [\cos(yt)]$

Figure 36:
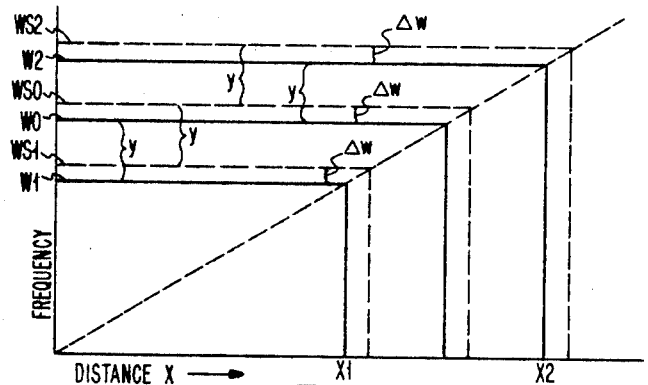
FIGURES 36, 37 and 38 are diagrams which are used to explain why the character recognition apparatus of the present invention is shift invariant.
Figure 37:
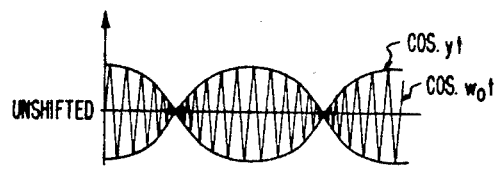
Figure 38:
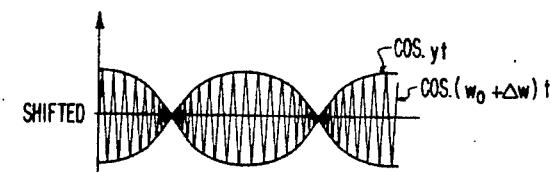

Assuming the character is shifted in the cell and taking the frequencies generated by the center of the character, that is points $x1$ and $x2$ as in the unshifted case, these same points in the character now control two different frequencies herein designated WS1 and WS2. These frequencies are shifted by an amount $\Delta w$ from the frequencies W1 and W2. However, since the two points on the character are the same distance apart irrespective of where the character is within the cell, the distance between the frequencies WS1 and WS2 are equal to the distance between frequencies W1 and W2. This is shown in FIGURE 36. The shifted frequencies WS1 and WS2 combine as shown in FIGURE 38. This can be expressed mathematically as follows:

(2) $\cos(W0+\Delta w+y)t + \cos(W0+\Delta w-y)t$
$= 2[\cos(W0+\Delta w)t][\cos(yt)]$ From FIGURES 37 and 38 it can be noted that the only difference between the signal represented by Equation 1 and the signal represented by Equation 2 is in the carrier frequency. However, as will be explained, the carrier frequency is eliminated prior to the recognition logic. Since the present system is entirely linear the above explanation can be extended by the principle of superposition to a complete spectrum of frequencies. It can also be shown by rigorous mathematics that the shape of the envelope at the output of each of the filters 332 is invariant with respect to shifts in the position of the character. Naturally, the shift in the position of the character must be within the bandpass characteristic of the associated filter.

The above discussion has only dealt with lateral shifts in the position of a character. The system is also invariant to vertical shifts in the position of a character. The reason for this is that the output signal is only dependent upon the amount of light at each frequency. A certain length of line will allow a certain amount of light pass. The frequency of the light at different elevations is the same; hence, moving a character vertically within a cell does not change the amount of light which reaches the photodetector at any frequency.

X. *Character recognition logic*

The de-multiplexor 314 and the recognition logic 315 (shown in FIGURE 14) will now be explained in detail. De-multiplexor 314 includes one bandpass filter associated with each character cell in the record. The band of frequencies allowed to pass through each filter corresponds to a band of frequencies which are assigned to the character cell associated with the particular filter. For example, the fifth character cell in the record shown in FIGURE 26 encompasses the band of frequencies between the points $a$ and $b$ in FIGURE 27, hence, the fifth filter allows the frequencies between $a$ and $b$ (FIGURE 27) to pass.

As previously explained, the output of each of the filters 331 and 332 (FIGURE 14) is a modulated carrier signal. The frequency of the carrier is the frequency at the center of each cell. The information relative to the character in the particular cell is contained in the shape of the envelope. By examining the shape of this envelope, recognition logic 315 can determine what character is located in each cell. Herein, for ease of explanation, separate recognition logic 380 is shown for each filter; that is, for each character cell. In a commercial system, for economy reasons, the recognition logic for the various cells would probably be time multiplexed. However, since this has no relevance with respect to the invention herein, the system is shown with a separate set of recognition logic 380 associated with each character cell.

Figure 39:
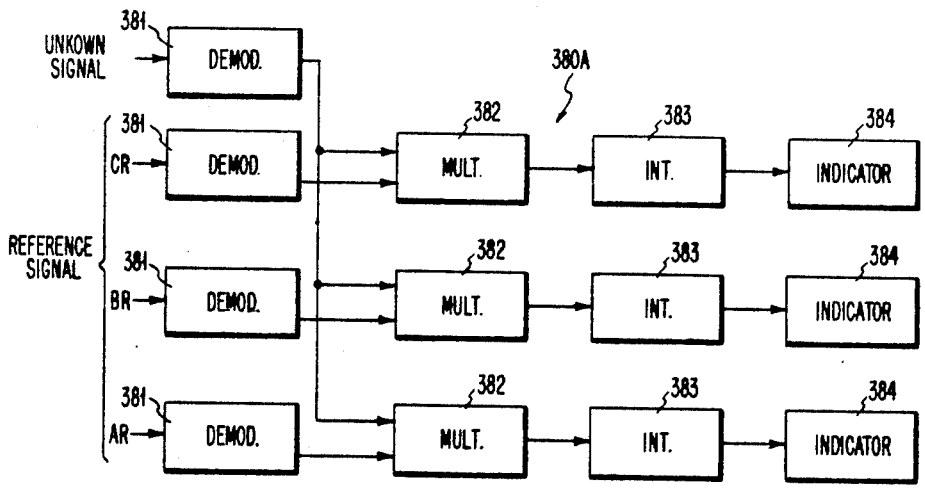
FIGURE 39 is a detailed block diagram of character recognition logic.

FIGURE 39 shows the details of recognition logic 380. Recognition logic 380 is essentially an analog type of recognition; however, a digital type of recognition could be used. Recognition logic 380 includes a plurality of de-modulators 381, a plurality of multiplying circuits 382, a plurality of integrating circuits 383, and a plurality of indicators 384. De-modulators 381 are conventional de-modulators which separate the carrier from the envelope. Thus, at the output of each de-modulator 381 only the envelope is present; the carrier frequency has been eliminated. Such de-modulators are well known in the art; hence, no description is given herein. The principle of operation of recognition logic 380 is that the input signal is compared to a signal from a reference character.

As shown in FIGURE 26, three reference characters are positioned in the last three character cells. Naturally, this means that the particular system shown herein is capable of recognizing only three different characters. A limited number of different characters are shown in the embodiment described herein merely for convenience in explanation. Naturally, the system can be expanded so as to recognize any desired number of different characters. For example, if there are N different reference characters, the characters A to N will be placed in the last N character cell in the record.

The de-multiplexor 314 (FIGURE 14) has two types of filters 331 and 332. Filters 331 were associated with the character cells which have reference characters therein, and they have no recognition logic associated therewith. Filters 332 are associated with the other character cells and each of these filters has character logic associated therewith. The output of filters 331 generate reference signals designated AR, BR and CR. Each of these signals is supplied to each of the recognition logic circuits 380.

One multiplication circuit 382 is provided for each reference signal. Each multiplication circuit 382 multiplies the associated reference signal times the unknown signal. An integrating circuit 383 is associated with each of the multiplication circuits 382. Thus, the output of each multiplication circuit 382 is integrated. The output of each integrator 383 either represents the cross-correlation of two different signals or the auto-correlation of two similar signals, depending upon whether the signal at the output of the de-modulator is the same as or different from the reference signal associated with the particular multiplier and integrator. Since each character cell may have one of three possible different characters therein, the output of each filter 332 in de-multiplexor 314 may have one out of three different envelopes. Multipliers 382 and integrators 383 compare the output of each filter 332 to all of the possible signals; thus, the output of at least one of the integrators 383 must be an auto-correlation rather than a cross-correlation. As is well known, the auto-correlation will produce a greater signal than the cross-correlation signal. Indicators 384 are set so that they will not respond to a signal which represents a cross-correlation; however, they will respond to a signal which represents an auto-correlation. Thus, by observing which particular indicator 384 is activated, the particular character located in a particular cell can be determined.

In summary, the signal from each cell is correlated with a plurality of reference signals. One of the correlations is an auto-correlation and the other correlations are cross-correlations, since all of the possibilities are present. The auto-correlation is a greater magnitude signal, thereby activating the associated indicator 384. The system is shift invariant since both the unknown signal and the reference signals are demodulated before the comparison.

As explained previously, a slight shift in position only affects the carrier frequency and it does not affect the shape of the envelope.

XI. *Two dimensional frequency assignment*

In the embodiments of the invention previously described there is a one dimensional assignment between frequency and distance. A further embodiment of the optical multiplexor will now be described, wherein there is a two dimensional assignment between frequency and distance. That is, the frequency of the shutter varies with both changes in the "x" dimension and with changes in the "y" dimension. A two dimensional optical multiplexor is useful for reading a multi-line image such as a printed page.

Figure 40:
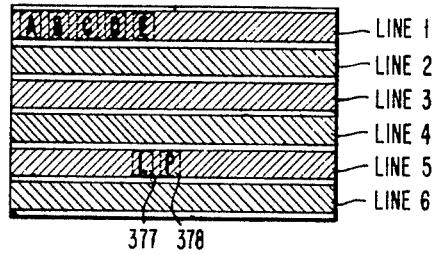
FIGURE 40 shows a multi-line image.

FIGURE 40 shows a page having six lines designated lines 1 to 6. For ease of illustration, all of the characters in the various lines are not shown. However, a plurality of characters are shown in line 1 and a plurality of characters are shown in line 5. The manner in reading the entire page with one optical multiplexor which has only one photoreceptor will now be explained. This explanation will refer specifically to the multiplexor 324C shown in FIGURE 23; however, it will be equally applicable to the other multiplexors which have been described.

Figure 41:
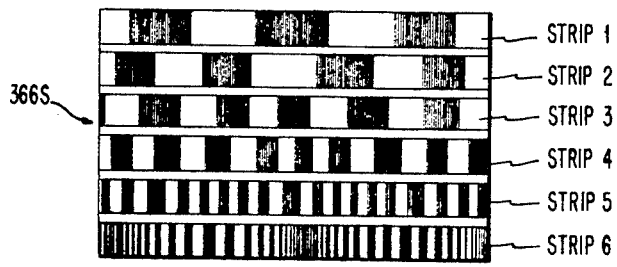
FIGURE 41 shows the certain components of an optical multiplexor for reading a multi-line image.
Figure 42:
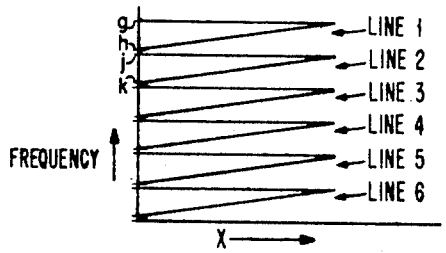
FIGURE 42 is a diagram which explains the operation of the multiplexor shown in FIGURE 41.

As previously described, belts 366 and 369 each have a plurality of Fresnel patterns sequentially arranged around their length in a single strip. In order to read an entire multiline page simultaneously, belts 366 and 369 must be divided into a plurality of strips, the number of strips being equal to the number of lines on the page. As shown on FIGURE 40, the page has six lines; hence, two identical belts each having six strips are needed. A segment of such a belt, designated 366S is shown in FIGURE 41. Each strip has a repetitive Fresnel pattern thereon. However, the parameter which controls the spacing of the Fresnel patterns for each strip is different. Thus, as the belts rotate in opposite directions they assign a different frequency to each point on each line. This is shown in FIGURE 42. Line 1 has frequencies within the range $g$ to $h$ assigned thereto, line 2 has frequencies within the range $j$ to $k$ assigned thereto, etc. Thus, a separate frequency is assigned to each point "x" along each of the six lines on the page.

XII. *Examples of other possible embodiments*

Figure 43:
FIGURES 43, 44 and 45 are diagrams used to explain three different types of dynamic shutters.

*Circular Fresnel patterns.*—FIGURE 43 shows two belts with circular Fresnel patterns. These patterns can be defined by the Fresnel formula in polar coordinates. The Fresnel patterns utilized in the embodiments of the dynamic shutter shown in FIGURES 23 and 25 are one-dimensional or cylindrical Fresnel patterns. For this reason the signals generated by systems using the dynamic shutters shown in FIGURES 23 and 25 only take into account variations in the record which have a spacial frequency in the "x" direction. These systems do not respond to any variations in the record which corresponded to spacial frequencies in the "y" direction. If the belts shown in FIGURE 23 and the cylinders shown in FIGURE 25 have two-dimensional Fresnel patterns thereon, such as those shown in FIGURE 43, the system will respond to any spacial frequencies in the "x" direction, as with the previous system, and it will also respond to one particular spacial frequency in the "y" direction. The particular spacial frequency in the "y" direction to which the system would respond depends upon the constants which defines the particular patterns used and upon the lateral separation of the centers of the patterns, that is, the separation of the patterns in a direction perpendicular to the direction of motion. Each belt or each cylinder would have a series of the Fresnel patterns such as those shown in FIGURE 23.

Figure 44:
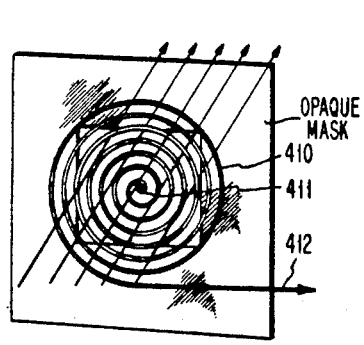
Figure 45:
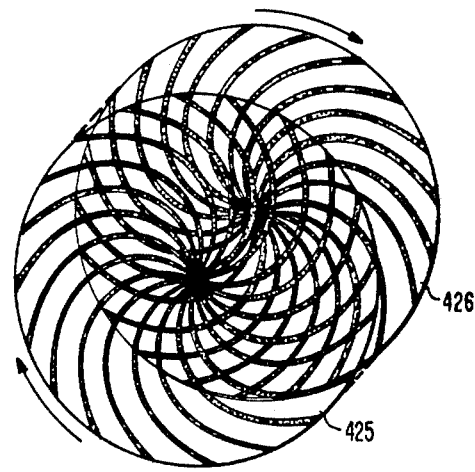

*Azimuth invariance.*—In previously explained embodiments of the invention which related to character recognition, the output was invariant relative to lateral shifts in the position of the character within a character cell. That is, the system generated the same signal irrespective of the "*x*" and "*y*" coordinates of the character in a character cell. The previously described system was not, however, invariant relative to changes in the azimuth or angular orientation of a character. That is, a character in a horizontal position would generate a different signal than a character in a vertical position. FIGURES 44 and 45 show two embodiments of a dynamic shutter which will generate azimuth invariant signals. That is, a system using the dynamic shutters of the type shown in FIGURES 44 and 45 will generate a signal which is invariant relative to the azimuth or angular orientation of a character.

FIGURE 44 shows a circular spring 410 which has a fixed center 411 and a movable end 412. End 412 of spring 410 is moved back and forth similar to the manner that end 342 of spring 340 shown in FIGURE 19 was moved back and forth. The light which is to be modulated shines through the spring in a direction perpendicular to the view shown in FIGURE 44. As the various elements of the spring cut across the light they modulate it, similar to the manner that the light was modulated by the embodiment shown in FIGURE 19. The signal generated by a character which is viewed through spring 410 is invariant relative to the angular orientation of the character.

FIGURE 45 shows two transparent elements 425 and 426 which have opaque patterns thereon in the form of a multiple spiral. The transparency of each element can be given by the following expression:

$$T = 1 + \cos(Nb - kr)$$

where:

$T$ = the transparency of a particular point which has polar coordinates $b$ and $r$
$N$ = an integer, 1, 2, 3, 4, etc.
$b$ = the angular coordinate of a point under consideration
$k$ = an arbitrary constant which dictate the amount of curvature in the lines
$r$ = the radial coordinate of a point under consideration The two elements 425 and 426 are positioned on top of each other, their center points being concentric, and they are rotated in opposite directions. The cumulative effect is a series of alternate transparent and opaque circles which move out from the center at a constant frequency, thus the shutter produced when elements 425 and 426 are superimposed and rotated in the opposite direction is equivalent to a shutter which has a different frequency at each different radius; however, the shutter has the same frequency at each azimuth. A signal generated by a character viewed through a shutter composed of elements 425 and 426 generates a signal which is invariant relative to the angular orientation of the character. Naturally, as with previous embodiments, if the transition between opaque and transparent areas in elements 425 and 426 is sudden, higher order harmonics are present. These harmonics can be minimized by making the transition between transparent and opaque areas in elements 425 and 426 gradual.

*Use of cathode ray tubes.*—Instead of using a light source and then a dynamic shutter to modulate the light source, as in the previously described embodiments, one could generate modulated light using a cathode ray tube. Appropriate timing circuitry would be connected to the deflection plates of the cathode ray tube so that a correct pattern would be displayed on its face. The light from the face would shine through the record to the photoreceptor thereby generating the multiplexed signal.

*Reflection rather than transmissive apparatus.*—In each of the embodiments shown herein only transmissive modulation is used, that is, both the dynamic shutter and the record consist of transparent and opaque areas and they modulate the light signal by either transmitting or not transmitting light through the various areas. Instead of using transmissive modulation the light could be modulated by either reflecting or not reflecting light. In this case the reflected light rather than the transmitted light would be used to activate the photoreceptor. The principle of modulation by reflctivity could be used for either the record or the shutter alone, or for both. The principle of the system would be the same if reflective modulation were substituted for transmissive modulation shown herein.

*Use of light pipes.*—In the system described herein the photoreceptor generates electrical signals in response to the light incident thereon and they transmit the electrical signal. Alternately, the photoreceptors could merely gather the light which passes through the record and the shutter and they could then transmit this light through "light pipes" to another point. The terminating point of the light pipe would then be equivalent to light source 15 in FIGURE 1. Of particular note is the fact that the entire image can be simultaneously transmitted through the light pipe even though the light pipe has no resolution.

*Facsimile system.*—The record transmission system shown in FIGURE 1 merely transmits a one-dimensional record. In order to transmit a two-dimensional record, a printed page, for example, each line of the record could be sequentially moved into the position of record 11 shown in FIGURE 1 and a narrow slit could be used to single out one line of the record. The record could be mechanically moved so that the various lines were sequentially scanned. In such a system each line would be transmitted simultaneously as are the entire records in the systems shown herein, and the various lines would be transmitted sequentially as the record is moved past the slit.

*Two-dimensional scanning.*—The embodiments of the invention previously described (except those shown in FIGURES 43 to 46) only recognize characters which have spacial frequencies (i.e., characters which vary) in the "*x*" direction. For certain characters the more pronounced spacial frequencies are in the "*y*" (or perpendicular) direction. Hence, better discrimination can be obtained by a system which responds to spacial frequencies in both directions. This can be accomplished by generating two images of each character and by then viewing one image with a first system through a shutter which has a frequency variation in the "*x*" direction, and by viewing the second image with a second system through a shutter that has a frequency variation in the "*y*" dimension. The output of the two systems would then be correlated to reference signals in order to recognize the character. Alternately, with a shutter such as that shown in FIGURE 23 each belt could be divided into two sections by a line along its length. One image of the character would be viewed through the first section of the belt by a first system in the previously described manner. The second image would be viewed through the second section of the belt and through a dove prism (which would rotate the image seen by the second system). The output of the two systems would then be correlated to reference signals to identify the character.

*Components not shown in drawings.*—The drawings only show those components necessary to the operation of the system. The various mechanical details which play no part in the invention and which can easily be supplied by those skilled in the art are not shown or described.

In FIGURES 1, 2, 7 and 14 the lenses, records and dynamic shutters are shown without any supporting mechanism. It should be understood that the supporting members should be opaque and they should completely surround the periphery of the various components so that all of the light must pass through the components shown in the drawings.

*Periodic structures.*—The ruled gratings shown in FIGURE 21 are merely one type of periodic structure which may be used to create Moire fringes. Any other periodic structure such as a phase grating could also be used.

While the invention has been particularly shown and described with reference to several preferred embodiments thereof, it will be understood by those skilled in the art that the foregoing and many other changes in the form and details may be made therein without departing from the spirit and scope of the invention.

What is claimed is:

1. A data transmission system, comprising:
   a record having variations in transparency in one dimension hereinafter designated the "x" direction;
   a shutter, the frequency of which is a function of the distance "x";
   a photoreceptor for generating an electrical signal in response to the light incident thereon;
   a light source;
   an optical system for directing light through said record and said shutter to said photoreceptor;
   means for transmitting said electrical signal;
   a second light source responsive to said electrical signals;
   a screen;
   a second shutter similar to said first shutter and synchronized therewith; and
   optical means for directing light from said second light source to said screen through said second shutter,
   whereby an image of said record is formed on said screen.

2. A data transmission system, comprising:
   a record having information thereon represented by a variation in optical properties in one dimension hereinafter designated the "x" dimension;
   a shutter, the frequency of which is a function of the distance "x";
   a single light source;
   a single photoreceptor;
   an optical system for directing light from said single light source to said record and said shutter and finally to said photoreceptor;
   image forming means including;
   a second light source responsive to said photoreceptor;
   a second shutter similar to said first shutter and synchronized therewith; and
   optical means for directing light from said second light source to said second shutter and finally to said screen,
   whereby an image of said record is formed on said screen.

3. A device for reading a printed page, said page being divided into lines, said lines being divided into character cells, selected character cells having characters printed therein;
   a shutter, the frequency of which varies as a function of the distance along each line, whereby a particular band of frequencies is assigned to each character cell;
   a photoreceptor for generating an electrical signal in response to the light incident thereon;
   a light source for generating light;
   an optical system for modulating said light by both said characters and said shutter and for directing the modulated light to said photoreceptors;
   a plurality of bandpass filters one for each character cell, each filter having a passband corresponding to the frequencies assigned to the associated character cell;
   means connecting the output of said photoreceptor to the input of said bandpass filters;
   means for generating a plurality of reference signals, each signal representative of a different character; and
   means for correlating the output of each filter to each reference signal,
   whereby the characters on said lines can be identified.

4. The device recited in clam 2 wherein said shutter comprises two counter rotating belts, each belt having a transparency, which varies according to the Fresnel formula.

5. The device recited in claim 2 wherein said shutter comprises two Fresnel patterns moving in opposite directions.

6. The device recited in claim 2 wherein said shutter comprises two counter rotating periodic structures.

7. The device recited in claim 3 wherein said shutter comprises two counter rotating belts, each belt having a transparency which varies according to the Fresnel formula.

8. The device recited in claim 3 wherein said shutter comprises two Fresnel patterns moving in opposite directions.

9. The device recited in claim 3 wherein said shutter comprises two counter rotating periodic structures.

10. The device recited in claim 3 wherein said means for generating a plurality of reference signals, includes:
    a plurality of reference characters in preselected character cells on said document, said reference characters being read together with the other characters on said document,
    whereby said reference signals are generated by the bandpass filters associated with the character spaces wherein said reference characters are located.

11. A document reading system, comprising:
    a document having a plurality of character cells, said character cells being arranged in a row, selected character cells having characters therein;
    a shutter, the frequency of which is a continuous function of the distance along said row, whereby each character cell has a particular band of frequencies assigned thereto;
    a single photoreceptor for generating an electrical signal in response to the light incident thereon;
    an optical system for illuminating the entire document, the light which illuminates said document being directed through said shutter to said single photoreceptor;
    a plurality of bandpass filters, one for each character cell, said bandpass filters being connected to the output of said photoreceptor;
    means for generating a plurality of reference signals, each reference signal representing a character; and
    means for correlating the output of each of said filters to each of the said reference signals,
    whereby the characters on said document can be identified.

12. The device recited in claim 11 wherein said means for generating a plurality of reference signals, includes:
    a plurality of reference characters in preselected character spaces on said document, said reference characters being read together with the other characters on said document,
    whereby said reference signals are generated by the bandpass filters associated with the character spaces wherein said reference characters are located.

13. A document reading system, said document having a plurality of character spaces arranged in rows, said document having characters selectively placed in selected character spaces;
    a shutter associated with each row of said document, the frequency of each shutter being a continuous function of the distance along the associated row, the frequency range of each shutter being different from the frequency range of each of the other shutters;
    a single photoreceptor for generating an electrical signal in response to the light incident thereon;
    a single light source;
    an optical system for illuminating the entire document with the light from said light source, the light which illuminates said document being directed to said shutter and finally to said single photoreceptor;

a plurality of bandpass filters, one for each character space on said document, said bandpass filters being connected to the output of said single photoreceptor;

means for generating a plurality of reference signals, each reference signal representing a different character; and means for correlating the output of said filters to each of said reference signals, whereby the characters on said documents can be identified.

14. The device recited in claim 13 wherein said means for generating a plurality of reference signals includes:

a plurality of reference characters in preselected character spaces on said document, said reference characters being read together with the other characters on said document, whereby said reference signals are generated by the bandpass filters associated with the character spaces wherein said reference characters are located.

15. A shift invariant system for reading an unknown character from a document, said character being located with a spacial character cell on said document, said system being shift invariant relative to angular displacement of said character within said cell;

a shutter, the frequency of said shutter being a continuous function of the radial distance from the center of said character cell, whereby a particular band of frequencies is assigned to said character cell;

a single photoreceptor for generating an electrical signal in response to the light incident thereon; and an optical system for illuminating the entire character cell, the light which illuminates said character cell being directed to said shutter and finally to said single photoreceptor, whereby said photoreceptor generates a signal which identifies the character in the character cell, said signal being invariant relative to shifts in the position of said character within said cell.

References Cited by the Examiner

UNITED STATES PATENTS

| | | | |
|---|---|---|---|
| 2,975,285 | 3/1961 | Palmer | 250—83.3 |
| 3,083,299 | 3/1963 | Cruse | 250—83.3 |
| 3,106,642 | 10/1963 | Shapiro | 250—83.3 |
| 3,114,149 | 12/1963 | Jessen | 250—83.3 |
| 3,141,095 | 7/1964 | Klose | 250—83.3 |
| 3,143,654 | 8/1964 | Aroyan et al. | 250—83.3 |
| 3,144,555 | 8/1964 | Aroyan et al. | 250—83.3 |
| 3,151,247 | 9/1964 | Auvermann | 250—83.3 |

References Cited by the Applicant

Article: Von A. Lohmann, "Zur Messung des optischen Ubertragungsfactors," Optik 14, Heft 11, 1957, pages 510–518.

Article: Von A. Lohmann, "Die Fresnel-Zonenplatte als Testobjekt," 31 Optik 18, Heft 10/11, pages 514–518.

Article: Von A. Lohmann, "Das Moire-Gitter als vielseitiges Testobjekt: Photoelektrische Aberrationsmessung," Internal Journal Optica Acts, volume 6, No. 1, pages 37–41, 1/59.

DARYL W. COOK, *Acting Primary Examiner.*

MALCOLM A. MORRISON, *Examiner.*

J. E. SMITH, *Assistant Examiner.*